(12) United States Patent
Yamamoto et al.

(10) Patent No.: US 7,485,686 B2
(45) Date of Patent: Feb. 3, 2009

(54) MANUFACTURING METHOD OF POLYOLEFIN

(75) Inventors: Kazuhiro Yamamoto, Kanagawa (JP); Kiyoshi Yukawa, Mie (JP); Yasuhiro Kashiwagi, Kanagawa (JP); Yoichi Maeda, Mie (JP)

(73) Assignee: Japan Polypropylene Corporation, Tokyo (JP)

( * ) Notice: Subject to any disclaimer, the term of this patent is extended or adjusted under 35 U.S.C. 154(b) by 0 days.

(21) Appl. No.: 10/901,230

(22) Filed: Jul. 29, 2004

(65) Prior Publication Data

US 2005/0032993 A1  Feb. 10, 2005

Related U.S. Application Data

(63) Continuation of application No. PCT/JP03/10337, filed on Aug. 14, 2003.

(30) Foreign Application Priority Data

Aug. 19, 2002  (JP)  ............... 2002-238179
Nov. 21, 2002  (JP)  ............... 2002-338580

(51) Int. Cl.
  *C08F 4/52* (2006.01)
  *C08F 2/00* (2006.01)

(52) U.S. Cl. ............... 526/160; 526/170; 526/71; 526/59; 526/943

(58) Field of Classification Search ............... 526/77, 526/62, 160, 72, 170, 67, 71, 59, 60, 943
See application file for complete search history.

(56) References Cited

U.S. PATENT DOCUMENTS

| | | | |
|---|---|---|---|
| 3,013,002 A | | 12/1961 | Breslow et al. |
| 3,600,463 A | * | 8/1971 | Hagemeyer, Jr. et al. .... 525/268 |
| 5,183,943 A | * | 2/1993 | Bryant et al. ............... 568/454 |
| 6,355,592 B1 | * | 3/2002 | Hlatky et al. ............... 502/103 |
| 7,141,630 B2 | * | 11/2006 | Vizzini et al. ............... 526/68 |
| 7,153,909 B2 | * | 12/2006 | Van Dun et al. ............ 525/240 |
| 2004/0072972 A1 | * | 4/2004 | Vizzini et al. ............... 526/70 |

FOREIGN PATENT DOCUMENTS

| | | | |
|---|---|---|---|
| EP | 949 278 A2 | * | 10/1999 |
| JP | 63-168407 | | 7/1988 |
| JP | 3-31304 | | 2/1991 |
| JP | 3-234709 | | 10/1991 |
| JP | 5-140227 | | 6/1993 |
| JP | 5-209013 | | 8/1993 |
| JP | 5-247128 | | 9/1993 |
| JP | 6-206924 | | 7/1994 |
| JP | 7-97388 | | 4/1995 |
| JP | 7-509753 | | 10/1995 |
| JP | 8-3226 | | 1/1996 |
| JP | 8-34749 | * | 2/1996 |
| JP | 9-47602 | | 2/1997 |
| JP | 10-87742 | | 4/1998 |
| JP | 11-49812 | | 2/1999 |
| JP | 11-60623 | | 3/1999 |
| JP | 11-140112 | | 5/1999 |
| JP | 11-510545 | | 9/1999 |
| JP | 2001-62202 | | 3/2001 |
| JP | 2001-206914 | | 7/2001 |
| JP | 2001-253906 | | 9/2001 |

OTHER PUBLICATIONS

Leino et al. Organometallics 1996, 15, 2450-2453.*

* cited by examiner

*Primary Examiner*—Vasu Jagannathan
*Assistant Examiner*—Rip A. Lee
(74) *Attorney, Agent, or Firm*—Oblon, Spivak, McClelland, Maier & Neustadt, P.C.

(57) ABSTRACT

A large-scale and efficient industrialization of olefin polymerization by metallocene catalysts is realized by, in olefin polymerization by metallocene-based catalysts, increasing catalytic activity and polymerization efficiency to sufficiently bring out the performances of the metallocene catalysts and maintain a stable polymerization reaction. The amount of a halogen-containing compound is controlled so that the gram-atomic amount ratio to a transition metal of a halogen atom in a halogen-containing compound in solvents and materials other than a halogen atom in a catalyst component is 0.8 or less, in manufacturing plants of commercial level in an olefin polymerization by a metallocene catalyst.

14 Claims, No Drawings

MANUFACTURING METHOD OF POLYOLEFIN

TECHNICAL FIELD

This application is a continuation of International application PCT/JP03/10337, filed Aug. 14, 2003.

The present invention relates to the improvement of a method of manufacturing polyolefin by polymerizing olefin with a single site catalyst, more specifically relates to the improvement of a polymerization method of polyolefin by a metallocene catalyst comprising a metallocene complex and a cocatalyst, and provides a polymerization method of polyolefin which can sufficiently exhibit the performances of a metallocene catalyst and maintain stable polymerization reaction.

BACKGROUND ART

Polyolefins, e.g., polyethylene and polypropylene, are excellent in a mechanical property, a chemical resisting property, and extremely excellent in the balance of these properties and economical efficiency, therefore, widely used in a variety of fields for various purposes as polymer materials having extremely high practicality.

These polyolefins have been conventionally manufactured as polyolefins excellent in various physical properties and stereoregularity by polymerizing olefin with so-called Ziegler-Natta catalysts comprising combination of mainly titanium trichloride, titanium tetrachloride, or transition metal catalysts carrying these on a carrier, e.g., magnesium chloride, with organoaluminum compounds. And improvement has been continued in catalytic activity and stereoregularity by using various kinds of carriers, electron donors and organosilane compounds.

Contrary to this, manufacturing methods of polyolefin by polymerizing olefin with so-called metallocene catalysts which are single site catalysts comprising transition metal complexes comprising metal atoms coordinated with cyclopentadienyl ring etc. in combination with cocatalysts such as aluminoxane, different from Ziegler-Natta catalysts which are multi-site catalysts, have been developed and these methods recently attract public attention rather than the polymerization methods by Ziegler-Natta catalysts.

This is because metallocene catalysts are soluble in organic solvents and make it possible to perform homogeneous polymerization, they have very high catalytic activity, they can bring about specific stereoregularities, and high molecular weight polyolefins having a narrow molecular weight distribution can be manufactured, and so the improvement and development in the ligands, substituents thereof, transition metals, cocatalysts and supports have been continued. In addition, the development of cocatalysts other than expensive aluminoxane and third components, e.g., organoaluminum compounds are now continued. Metallocene catalysts also make it possible to polymerize higher olefins, cyclic olefins and polar monomers.

As described above, metallocene catalysts are generally recognized as epoch-making, very excellent and important catalysts in the polymerization of polyolefin, however, metallocene catalysts have many problems to be solved, such as the application to heterogeneous reaction such as slurry polymerization, the development of the substitutes of expensive aluminoxane, and the reduction of sensitive catalytic activity due to impurities. In particular, metallocene catalysts are more sensitive to impurities in a polymerization reaction system as compared with Ziegler-Natta catalysts, accordingly strict control and management of materials such as monomers and catalysts and impurities in polymerization reaction are required, which has been a bottleneck in the way of large-scale and efficient industrialization of olefin polymerization by metallocene catalysts.

A variety of proposals for improvement have been done for the purpose of improving these problems in the industrialization of metallocene catalysts. For example, as the application to heterogeneous reaction, a proposal to use silica-supported methylaluminoxane (refer to patent literature 1), a proposal to use non-coordinate boron compounds of Lewis acid as the substitute for expensive aluminoxane (refer to patent literature 2 and 3), and a proposal to use ion exchange layered silicate (refer to patent literature 4 and 5) are disclosed.

Further, for increasing polymerization efficiency by excluding impurities, the improving means of materials have been supposed in large numbers in recent years, and for refining the solvents after polymerization reaction for reuse, e.g., a method of bringing the solvent to be reused into contact with an adsorbent and removing the components originated from the metallocene compound by adsorption is disclosed (refer to patent literature 6). For removing impurities from catalyst components, there are disclosed a refining method by washing a metallocene compound containing ether compound impurities with a halogenated hydrocarbon solvent (refer to patent literature 7), a method of differentially refining transition metal-aromatic compounds containing impurities by liquid chromatography packed with porous carbon (refer to patent literature 8), and to improve the quality of metallocene catalysts, a method of separating inorganic impurities such as metal halide by using organic solvents and removing organic impurities by granulated adsorbing materials (refer to patent literature 9), and to refine feedstock gas to be reused, a method of preventing the reduction of activity of metallocene catalysts by removing impurities by passing unreacted gas after polymerization reaction through fixed bed adsorption column (refer to patent literature 10).

In addition, for increasing polymerization efficiency by removing impurities, although specific impurities are not exemplified, it is also disclosed to use organoaluminum compounds as the scavenger to remove impurities (refer to patent literature 11 and 12). Triethylaluminum and triisobutylaluminum are mainly used as the organoaluminum of scavengers which are the antidotes of catalysts. In addition, in this case, it was conventionally thought that every catalyst poison could be removed by the above organoaluminum. However, as described later, it was unexpectedly found from the close examination by the present inventors that halogen-containing compounds become strong catalyst poisons to metallocene catalysts.

And in any of the above methods, it seems that impurities are not sufficiently detoxified or removed, and catalytic activity and polymerization efficiency are not completely satisfied. Further, methods of specifying the catalyst poisons of metallocene catalysts and adopting effective means against them have not been realized yet.

As described above, metallocene catalysts are more sensitive to impurities in the system of polymerization reaction as compared with Ziegler-Natta catalysts, therefore, strict control and management of materials such as monomers and catalysts and impurities in polymerization reaction are required, which problems have been bottlenecks in the way of large-scale and efficient industrialization of olefin polymerization by metallocene catalysts, and recognized as the main problem to be solved.

[Patent literature 1]: JP-A-6-206924 (claim 1, paragraphs 0013 and 0063) (the term "JP-A" as used herein means an "unexamined published Japanese patent application").
[Patent literature 2]: JP-A-3-234709 (claim 1).
[Patent literature 3]: JP-A-5-247128 (paragraph 0024).
[Patent literature 4]: JP-A-11-49812 (claim 1).
[Patent literature 5]: JP-A-11-140112 (claim 1).
[Patent literature 6]: JP-A-2001-62202 (claim 1).
[Patent literature 7]: JP-A-7-97388 (claim 1).
[Patent literature 8]: JP-A-9-47602 (claim 1).
[Patent literature 9]: JP-T-11-510545 (abstract, claim 1) (the term "JP-T" as used herein means a published Japanese translation of a PCT patent application).
[Patent literature 10]: JP-A-8-3226 (claim 1).
[Patent literature 11]: JP-A-5-140227 (paragraph 0061).
[Patent literature 12]: JP-A-11-60623 (paragraph 0009).

In the state of problems in metallocene catalysts, it is thought to be novel and important objects to increase catalytic activity and polymerization efficiency by the accurate control of materials such as monomers and catalysts or solvents and impurities in polymerization reaction systems, to sufficiently bring out the performances of metallocene catalysts and maintain stable polymerization reaction, to thereby embody large-scale and efficient industrialization of olefin polymerization by metallocene catalysts.

These problems are recognized to be important in olefin polymerization by metallocene catalysts, however, in the past, only attention was paid to the removal of unspecified impurities in individual material such as catalyst, solvent etc., and it was hardly known to synthetically and accurately control impurities by grasping both material systems and polymerization reaction systems.

The present invention aims at solving these new problems and bringing out the performances of metallocene catalysts and maintaining stable polymerization reaction, to thereby embody large-scale and efficient industrialization of olefin polymerization by metallocene catalysts. That is, the object of the present invention is to provide a manufacturing method of polyolefin capable of maintaining stable production by sufficiently bringing out the performances of catalysts under the conditions not influenced by the catalyst poisons of impurities.

DISCLOSURE OF THE INVENTION

In the course of examination of effectively increasing catalytic activity and polymerization efficiency in the polymerization of olefin by single site catalysts, particularly metallocene catalysts, the present inventors came to think that catalytic activity and polymerization efficiency can be effectively increased by grasping both material systems and polymerization reaction systems and controlling impurities synthetically and accurately based upon the prior art of the removal of impurities in individual material such as catalyst, solvent etc., thereby the performances of metallocene catalysts can be brought out and stable polymerization reaction can be maintained. The present invention to solve the above problems has been embodied as a result of synthetic examination of the influences by impurities in material system and polymerization reaction system.

In the polymerization of olefin by metallocene catalysts representative of single site catalysts, as a result of synthetic and experimental examination of the influences by impurities in material system and polymerization reaction system, and the analysis of the components of impurities and considerations, it was found and confirmed that halogen compounds are present as the impurities in material system and polymerization reaction system, and these halogen compounds cause the reduction of catalytic activity of metallocene catalysts and degradation of polymerization efficiency of olefin polymerization.

The marvel is that the halogens contained in metallocene complexes themselves of metallocene catalysts do not bring about such maleficent influence, and rather function to increase catalytic activity and polymerization efficiency. Although halogen-containing compounds give good effects to polymerization systems in some cases and it is disclosed in patent literature 4 and 5 that activity increases when polymerization is performed with a system containing halogen-containing compounds, this function of halogen-containing compounds is limited to the case where they are used under the condition of combination with specific ion exchange layer structural compounds, so that the function is thought to be exceptional.

The present invention capable of effectively increasing catalytic activity and polymerization efficiency has completed by synthetically and accurately controlling halogen impurities in both systems of material system and polymerization reaction system, i.e., compounds containing halogen and simple substance of halogen, in polymerization of olefin by metallocene catalysts.

Halogen impurities include those originating in materials such as solvents and monomers, those generated as reaction by-products during polymerization reaction and those brought about as contaminants from polymerization apparatus, and they are present as inorganic and organic halogen compounds, simple substances of halogen or ions (hereinafter they are sometimes referred to as simply "halogen-containing compounds" as a general term). The existing amount of halogen impurities depends upon the degree of impurity of materials and conditions of polymerization reaction.

Removal of organic chlorine compounds in refining the polymerization solvents in polymerization by Ziegler-Natta catalysts for reuse is disclosed in conventional literature (JP-A-3-31304, page 3, right upper column), but there is merely described to remove organic chlorine compounds with other impurities from the solvents and the amount and the control in polymerization reaction are not disclosed at all, therefore, this disclosure is not the anticipation of the present invention.

From the results of synthetic and accurate controlling of halogen-containing compounds as the halogen impurities in the polymerization of olefin by metallocene catalysts and close examination of the conditions to effectively increase catalytic activity and polymerization efficiency by experiments, the present inventors conjectured that the amount of halogen deeply participates in effectively increasing catalytic activity and polymerization efficiency, and that the amount of halogen closely relates to the amount of the metal of the metallocene catalyst to be introduced into polymerization reaction. As a result, the present inventors specifically got to prescribe the amount of halogen by experiments, thereby the central constitution of the present invention could be formed.

That is, the present inventors found that the performances of catalysts could be sufficiently brought out and stable production could be maintained by controlling, exclusive of the halogen atoms originating in catalysts, the amount of halogen atoms originating in the halogen-containing compounds present in a polymerization reactor as small as possible, i.e., by making the amount of halogen atoms a prescribed amount or lower on the basis of the amount of the metal of the metallocene catalyst which is introduced into a polymerization reactor, thereby the present invention has completed.

Halogen atoms originating in metallocene complexes are of course included in halogen atoms originating in catalysts, and halogen atoms originating in cocatalysts and catalyst-supports, if contained, are included in the halogen atoms originating in catalysts, as described later in detail, and these halogen atoms are out of the objects of controlling. Further, with respect to the organoaluminum in the third components of catalysts, whether the halogen contained in the organoaluminum has a bad influence upon olefin polymerization or not is not clearly known, accordingly halogen-containing organoaluminum (organoaluminum halide) is not used as the third component of catalyst in the olefin polymerization of the present invention as described later.

The essence of the present invention lies in the point that the present inventors have found that halogen compounds appendant to the materials of polymerization, halogen impurities included in polymerization solvents for reuse performed in manufacturing plant of a commercial scale, or organic halogen compounds included in the materials for the maintenance of polymerization apparatus have a bad influence upon polymerization by metallocene catalysts, and it can be said that a trial to increase catalytic activity and polymerization efficiency from such a standpoint is epoch-making. (Such halogen may be called "bad halogen".)

In other words, the characteristic of the present invention is in controlling the existing amount of halogen-containing compounds as the catalyst poisons, and the essence of the present invention lies in performing the operating method or preventing method described later, e.g., when the existing amount of halogen-containing compounds exceeds the range prescribed in the invention due to any abnormality.

The present invention is constituted of the following units of the invention with the first invention as the unit of fundamental invention, and on and after the second invention are the units of the invention to embody or carry out the fundamental invention.

First invention: A method for effectively producing polyolefin by polymerizing an olefin using a single site catalyst, which comprises controlling an amount of a halogen-containing compound present in a polymerization reaction and not in a catalyst component, where the gram-atomic amount ratio of a halogen atom in the halogen-containing compound to a transition metal in the single site catalyst is 0.8 or less.

Second invention: The method for effectively producing polyolefin as described in the first invention, wherein the single site catalyst is a metallocene catalyst comprising the following components (A) and (B), and further, if necessary, (C):
component (A): a metallocene complex,
component (B): a cocatalyst, and
component (C): an organoaluminum compound (provided that organoaluminum halide compounds are excluded).

Third invention: The method for effectively producing polyolefin as described in the first or second invention, wherein alpha-olefin having 3 or more carbon atoms is polymerized or copolymerized as olefin.

Fourth invention: The method for effectively producing polyolefin as described in the second invention, wherein the transition metal complex component of the metallocene complex in the metallocene catalyst is a compound of transition metal having a conjugated 5-membered ring ligand, belonging to Groups 4 to 6 of the Periodic Table.

Fifth invention: The method for effectively producing polyolefin as described in the second to fourth inventions, wherein the cocatalyst which activates the metallocene complex in the metallocene catalyst is any of an aluminumoxy compound, an ionic compound or a Lewis acid, a solid acid, and ion exchange layered silicate.

Sixth invention: The method for effectively producing polyolefin as described in the second to fifth inventions, wherein the cocatalyst which activates the metallocene complex is an organic boron compound, and a polyolefin to be produced is a polymer of ethylene or propylene, a copolymer of ethylene and alpha-olefin having 3 or more carbon atoms, or a copolymer of propylene and other alpha-olefin having 2 or more carbon atoms.

Seventh invention: The method for effectively producing polyolefin as described in the first to sixth inventions, which comprises controlling any or all of the amount of an organic compound to which a halogen atom is bonded, the amount of a silicon atom-containing compound to which a halogen atom is bonded, the amount of an aluminum atom-containing compound to which a halogen atom is bonded, the amount of a compound to which a halogen atom in an organic solvent is bonded, and the amount of a halogen-containing compound which is the impurity from a polymerization apparatus.

Eighth invention: The method for effectively producing polyolefin as described in the seventh invention, wherein the halogen-containing compound which is the impurity from a polymerization apparatus originates from the sealing paste of gasket of a flange.

Ninth invention: The method for effectively producing polyolefin as described in the first to eighth inventions, wherein the halogen is chlorine.

Tenth invention: The method for effectively producing polyolefin as described in the first to ninth inventions, wherein, when the gram-atomic amount ratio of a halogen atom in a halogen-containing compound present in a polymerization reaction and not in a catalyst component to a transition metal is more than 0.8, the method comprises reducing the amount of the halogen-containing compound existing in the polymerization reaction so that the gram-atomic amount ratio is maintained 0.8 or less.

The mode for carrying out the groups of the present invention is described in detail below with laying stress on the control of halogen-containing compounds in olefin polymerization.

(1) Regarding the Control of Halogen-Containing Compound:

(A) Prescription by Gram-Atomic Weight

As described above, the present invention comprises as the fundamental constitution a method for improving polyolefin manufacture in manufacturing polyolefin by polymerizing olefin by using a single site catalyst, which comprises controlling the amount of a halogen-containing compound so that the gram-atomic weight of halogen atoms originating in a halogen-containing compound included in the polymerization reaction other than the halogen atom originating in the catalyst component becomes 0.8 or less of the gram-atomic weight of a transition metal of the single site catalyst to be introduced. By adopting the constitution, the performances of metallocene catalysts can be sufficiently brought out and stable production can be maintained.

In the following, metallocene catalysts which are the representative of single site catalysts are specifically described.

In polymerization of olefin by metallocene catalysts, to effectively increase catalytic activity and polymerization efficiency by synthetically and accurately controlling halogen-containing compounds containing halogens which come to catalyst poisons, in particular, chlorine, bromine and iodine, and by close examination of the conditions to effectively increase catalytic activity and polymerization efficiency by experiments, it has been found that the amount of halogen, other than the halogen atoms originating in catalyst components, closely relates to the amount of the metal of the metallocene catalyst to be introduced into polymerization reaction, as a result, the present inventors specifically got to prescribe the amount of halogen by experiments. It has been found that it is sufficient to control the amount of a halogen-containing compound so that the gram-atomic amount ratio of a halogen atom originating in a halogen-containing compound included in the polymerization reaction other than the halogen atom originating in the catalyst component to transition metal of the single site catalyst to be introduced, is 0.8 or less. This is confirmed by examples and comparative examples described later.

It is sufficient to control the amount of a halogen-containing compound so that the gram-atomic amount ratio of halogen atom(s) to transiton metal of the single site catalyst to be introduced is preferably 0.6 or less, more preferably 0.3 or less. The numeric value is preferably as small as possible, but considering the difficulty in processing and profitability, the value should not be very smaller than 0.6.

For example, 1 mol of dichloroethane has two Cl atoms, it is 2 gram-atomic weight calculated in terms of halogen.

(B) Inhibition of Inclusion of Halogen-Containing Compound:

Since when halogen impurities, i.e., halogen-containing compounds, in both systems of material system and polymerization reaction system are synthetically and accurately controlled, catalytic activity and polymerization efficiency can be effectively increased, it is important to prevent inclusion of the halogen-containing compound in a polymerization reactor as far as possible.

As described above, halogen-containing compounds are present as inorganic and organic halogen compounds, simple substances of halogen or ions, and they include those originating in materials such as solvents and monomers, those occur as reaction by-products during polymerization reaction, and those brought about as contaminants from polymerization apparatus. For reducing these halogen-containing compounds as far as possible, it is necessary to sufficiently refine materials such as solvents and monomers in advance, inhibit side reaction in polymerization reaction, and perform process so as not to bring about contaminants from polymerization apparatus.

As the specific means to control the amount of halogen-containing compounds, there are:

a. Assay in Accepting Materials and Auxiliaries:

A method of performing analysis of materials and auxiliaries, and using them when the values are lower than the tolerance set in advance.

b. Refining of Materials and Auxiliaries:

Materials are refined by ordinary methods, e.g., methods by distillation or chemical reaction, and physical methods such as adsorption can be used.

As specific refining methods, a method of passing materials and solvents through a refining column packed with an adsorbent which chemically or physically adsorbs halogen-containing compounds can be exemplified. It is necessary to select an appropriate adsorbent according to purpose. Adsorbents which can adsorb halogen-containing compounds are exemplified in *Shokubai Techo* (*Catalyst Notebook*), published by SÜD-CHEMIE CATALYSIS JAPAN, INC. For example, ZnO, CaO, CuO, $Al_2O_3$, $Na_2O$, etc., are included.

As other specific refining method, a method of removing halogen-containing compounds by precision distillation can be exemplified.

c. Removal of Halogen-Containing Compounds in Polymerization reaction system:

According to the above methods, the inclusion of halogen-containing compounds from materials and auxiliaries can be prevented to some extent. However, there are cases where halogen-containing compounds are contained in the sealing paste of gasket used for the maintenance of equipment, and it is confirmed that halogen-containing compounds are included in the system from the sealing part of a flange. These impurities, so to say, "occur" in the system, and a removing means is necessary. Specifically, the use of adsorbents described in (ii) can be adopted.

d. Others:

That is achieved by controlling the side reaction in polymerization reaction, e.g., the amount of halogen by-product is restrained by examining various conditions such as temperature and pressure. It is also important to assay and control the halogen amount with the polymerization reaction.

As the sealing pastes in polymerization apparatus, those containing halogen as little as possible are used, and the inside of an apparatus is previously maintained clean.

As described above, the halogens contained in the metallocene complexes themselves of metallocene catalysts do not bring about these maleficent influences, and rather function to increase catalytic activity and polymerization efficiency. Further, some of cocatalysts such as boron compounds or carriers carrying catalysts contain halogen as the constitutional component. Since cocatalysts or carriers are used as a result of evaluation of effectiveness of themselves, those containing halogen can be used, and the halogen supplied by these components are excepted from the object of controlling in the present invention. However, it is preferred to refine and remove halogen-containing compounds as the impurities appendant to each component of catalysts in advance.

It is a characteristic of the present invention that the halogen originating in catalyst materials are not necessary to be controlled. The numeric value of the amount of this halogen can be computed in advance in polymerization, and this value is deducted from the amount of halogen to be controlled.

Compounds containing fluorine give good results to polymerization systems in some cases. In this meaning, the present invention can be understood to be technique to make compounds sufficiently exhibit functions in the selected reaction system.

As the halogens which become catalyst poisons in the present invention, fluorine, chlorine, bromine and iodine are objects, but the halogen appendant to polymerization materials is generally chlorine, so that chlorine atoms are generally supposed as the halogen.

(C) Exemplification of Main Sources of Halogen-Containing Compound:

As the compounds which are the sources of halogen-containing compound, i.e., catalyst poison which reduces the polymerization activity of metallocene catalysts, the following compounds are exemplified.

a. Appendant to Al Atom-Containing Compounds:

As the main courses of inclusion of inorganic halogen compounds, the case of inclusion as Al atom-containing compound component of a raw material in the solvent used in Ziegler-Natta catalyst, in which the solvent is diverted into a metallocene polymerization, and the case of inclusion as the impurities of organoaluminums, are exemplified.

In manufacturing process of organoaluminum, as the manufacturing method of alkylaluminum halide, a method of using the disproportionation of trialkylaluminum or alkylaluminum halide and aluminum trichloride is generally used.

In the manufacture of such alkylaluminum halide, when organoaluminum not containing halogen such as trialkylaluminum is manufactured after manufacturing aluminum halide or alkylaluminum halide without sufficiently cleaning the reactor, a used raw material tank or residence part of pipeline, there is a case where the residual halogen-containing compound is included in a product.

In the case of organoaluminum, since it is extremely difficult to remove halogen components such as chlorine contained as impurities by refining, it is important not to include halogen components in manufacturing stage or in using in the manufacture of polyolefin.

b. As Organic Halogen Compound:

Organic halogen compounds are in many cases included in organic solvents used in catalyst manufacture or for dilution. Particularly in catalyst manufacture, if the solvents used in the manufacture of Ziegler-Natta catalyst are recycled and reused, there is a possibility that any reaction is occured between the solvents and the chorine atoms contained in titanium trichloride and titanium tetrachloride to form the organic halogen compounds and be included as they are.

Further, there are cases where organic halogen compounds are contained as the component of the sealing paste used in the gaskets of a reactor and pipeline in polymerization reaction, and this is also the cause of inclusion.

The specific examples of halogen compounds include aliphatic compounds, e.g., dichloromethane, chloroform, chloroethane, dichloroethane, trichloro-ethane, tetrachloroethane, chloropropane, dichloropropane, trichloropropane, chlorobutane, dichlorobutane, chloropentane, dichloropentane, chlorohexane, dichlorohexane, chloroheptane, dichloroheptane, and polychlorotrifluoroethane.

Further, as the organic halogen compounds, there is a possibility of the inclusion of aromatic compounds and the compounds containing hetero atoms.

c. As Silicon Atom-Containing Halogen Compounds:

For example, when Ziegler-Natta catalysts are manufactured, silicon atom-containing halogen compounds are included in some cases in washing recovery solvents as the by-product of the addition of the electron donor (a so-called silicon donor) for providing stereoregularity. It is thought that silicon atom-containing halogen compounds are included when the above solvents are re-refined and reused.

The specific examples of the compounds include chlorotrimethylsilane, dichlorodimethylsilane, methyl-trichlorosilane, ethyltrichlorosilane, butyltrichlorosilane, cyclopentyltrichlorosilane, phenyltrichlorosilane, chlorocyclohexyldimethylsilane, trichlorocyclohexylsilane, and dichloromethylvinylsilane. In addition to these compounds, the inclusion of silicon-containing compounds containing an aromatic group and further containing hetero atoms is thought.

(D) Consideration on the Hindrance of Polymerization Reaction by Halogen-Containing Compounds:

It can be thought that halogen-containing compounds hinder normal olefin polymerization by coordinating to a transition metal compound and deteriorating the active site of the transition metal compound.

It is known that when organoaluminum is used, the deterioration of active site by the function of the polar compound is generally inhibited, but halogen-containing compounds show a singular behavior of incapable of inhibiting the deterioration of active site by organoaluminum which is a scavenger, although halogen-containing compounds are polar compounds.

The reason is presumably that Lewis basic property of a halogen atom, i.e., a property easily interacting with cation species, is not lost by the inhibiting function of organoaluminum.

(E) Analyzing Method of Halogen Atoms:

As the analyzing methods of halogen compounds which are used for controlling the amount of halogen present in a polymerization reaction system, an atomic absorption method and a method using gas chromatography, liquid chromatography or ion chromatography are exemplified.

For example, as the analyzing method of chlorine compounds, besides the above methods, analyzing methods of precipitating silver chloride by an excess amount of silver nitrate in advance, and then titrating the surplus silver nitrate by ammonium thiocyanate solution with an indicator of ammonium ferric sulfate, or determining by measurement of the absorbance can be used.

Analysis of halogen atoms is described by means of methods for assaying the amount of halogen atoms (chlorine) present in a reactor during polymerization reaction as examples.

a. A method of measuring the amount of the chlorine atoms contained in the material in advance, and assaying the amount of the chlorine atoms present in a reactor from the amount of each material introduced into the reactor.

b. A method of assaying the amount of the chlorine atoms present in a reactor after each material has been introduced into a reactor, or after manufacturing conditions have become a steady-state in the case of continuous process, by directly sampling the chlorine atoms from a reactor.

c. A method of determining the amount of chlorine atoms by sampling chlorine atoms in the middle of the line circulating each material, and assaying the amount of the chlorine atoms introduced into a reactor from the balance of the amount of each material circulating in the reaction system and that discharged from the reaction system.

(2) Regarding Single Site Catalyst and Metallocene Catalyst:

The present invention fundamentally relates to single site catalysts, and metallocene catalysts which are the representative of single site catalysts are specifically described as an example.

Metallocene catalysts for use in the present invention are not particularly restricted and well-known catalysts can be used. A metallocene catalyst generally comprises (A) a metallocene complex of a transition metal compound belonging to Group 4 or the like of the Periodic Table having a conjugated 5-membered ring ligand, (B) a cocatalyst which activates the metallocene complex, and (C) an organoaluminum compound which is used if necessary. Since granulation is essential according to the characteristics of the olefin polymerization process, (D) a carrier is made a constituent in such a case.

(In the specification of the invention, a short form of the Periodic Table is used as the Periodic Table of elements.)

(A) Metallocene Complex:

As the metallocene complexes which are used in the present invention, metallocene complexes of transition metal compounds belonging to Groups 4 to 6 of the Periodic Table having a conjugated 5-membered ring ligand are representative, and of these complexes, a metallocene complex represented by any of the following formula is preferred:

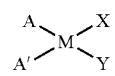

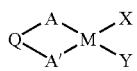

In the formulae, A and A' each represents a cyclo-pentadienyl group which may have a substituent. The example of the substituent include a hydrocarbon group having from 1 to 30 carbon atoms. The hydrocarbon group may be bonded to the cyclopentadienyl group as a monovalent group, or when a plurality of hydrocarbon groups are present, two of these groups may be linked respectively at other terminals (ω-terminal) and form a ring with a part of the cyclopentadienyl group. As other examples, an indenyl group, a fluorenyl group, and an azulenyl group are exemplified. These groups may further have a substituent on the side ring.

Of these groups, an indenyl group or an azulenyl group is preferably used.

Q represents a linking group crosslinking two conjugated 5-membered ligands at arbitrary positions, specifically an alkylene group, a silylene group or a germylene group is preferred. These groups may further have a substituent.

M represents a metal atom of a transition metal selected from Groups 4 to 6 of the Periodic Table, preferably titanium, zirconium or hafnium, particularly zirconium or hafnium is preferred.

X and Y each represents an auxiliary ligand which reacts with component (B) and forms active metallocene having an olefin polymerizing ability. Accordingly, so long as the object is achieved, the kinds of ligands of X and Y are not restricted, and each represents a hydrogen atom, a halogen atom, a hydrocarbon group, or a hydrocarbon group which may have a hetero atom. Of these, a hydrocarbon group having from 1 to 10 carbon atoms or a halogen atom is preferred.

(B) Cocatalyst (Activating Agent Component):

A cocatalyst is a component which activates a metallocene complex, and reacts with the auxiliary ligand of the metallocene complex and is capable of converting the metallocene complex to an active seed having an olefin polymerizing ability. Specifically, the following (B-1) to (B-4) are exemplified.

(B-1) An aluminumoxy compound
(B-2) An ionic compound or a Lewis acid capable of reacting with component (A) and converting component (A) to a cation.
(B-3) A solid acid
(B-4) An ion exchange layered silicate In (B-1) an aluminumoxy compound, it is well-known that an aluminumoxy compound can activate a metallocene complex, and a compound represented by each of the following formula is exemplified as such a compound.

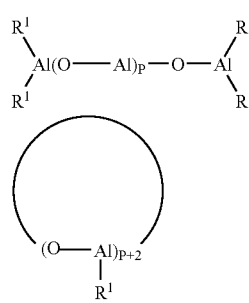

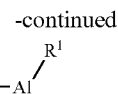

In each of the above formulae, $R^1$ represents a hydrogen atom or a hydrocarbon group, preferably a hydrocarbon group having from 1 to 10 carbon atoms, and particularly preferably a hydrocarbon group having from 1 to 6 carbon atoms. A plurality of $R^1$'s may be the same or different. p represents an integer of from 0 to 40, preferably from 2 to 30.

In the above formulae, compounds represented by the first formula and the second formula are compounds called aluminoxane, and methylaluminoxane and methylisobutyl-aluminoxane are preferred. A plurality of aluminoxanes can also be used in combination in each group or between each group. The above aluminoxane can be prepared under various well-known conditions.

A compound represented by the third formula can be obtained by the reaction of one kind of trialkylaluminum or two or more kinds of trialkylaluminums with alkylboronic acid represented by formula $R^2B(OH)_2$ in proportion of 10/1 to 1/1 (molar ratio). In the above formulae, $R^1$ and $R^2$ each represents a hydrocarbon group having from 1 to 10 carbon atoms, preferably from 1 to 6 carbon atoms.

A compound in (B-2) is an ionic compound or a Lewis acid compound capable of reacting with component (A) and converting component (A) to a cation. As these ionic compounds, compounds wherein a cation, e.g., a carbonium cation or an ammonium cation, and an anion, e.g., a tetraphenyl borate, a tetrakis(3,5-difluorophenyl) borate, a tetrakis(pentafluorophenyl) borate, or a tetrakis(penta-fluorophenyl) aluminate form an ion pair are exemplified.

As the above Lewis acid compound, various organic boron compounds, e.g., tris(pentafluorophenyl) boron, are exemplified. Alternatively, metal halogen compounds, e.g., aluminum chloride and magnesium chloride are exemplified.

A certain kind of the above Lewis acid compound can be grasped as the ionic compound capable of reacting with component (A) and converting component (A) to a cation. The above-described metallocene catalysts using non-coordinate boron compounds are disclosed in JP-A-3-234709 and JP-A-5-247128.

These ionic compound or Lewis acid compound are preferably organic boron compounds. The organic boron compounds here include ionic compounds wherein an organic boron compound is present as a part of the ion pair.

As the specific example of the organic boron compound, at least one compound of a compound represented by the following formula (1) which is a Lewis acid compound and a compound represented by formula (2) which is an ionic compound is exemplified.

$$BR^3R^4R^5 \qquad (1)$$

(In the formula, $R^3$, $R^4$ and $R^5$, which may be the same or different, each represents a halogenated aryl group having from 1 to 14 carbon atoms, or a hydrocarbon containing a halogenated allyloxy group);

$$A(BR^6R^7R^8R^9)_n \qquad (2)$$

(In the formula, A represents a quaternary amine, quaternary ammonium salt, carbo cation, or a metallic cation having a valency of from +1 to +4, $R^6$, $R^7$, $R^8$ and $R^9$, which may be the same or different, each represents a halogenated aryl group having from 1 to 14 carbon atoms, or a hydrocarbon group containing a halogenated alkyl group, and n represents an integer of from 1 to 4.

As the specific examples of the hydrocarbon groups represented by formula (1) and (2), a pentafluorophenyl group, a pentafluorobenzyl group, a tetrafluorophenyl group, and a tetrafluorotolyl group are preferred.

As the specific examples of A in formula (2), N,N-dimethylanilinium and triphenylmethyl are preferred.

As the solid acid in (B-3), alumina, silica-alumina and silica-magnesia are exemplified.

The ion exchange layered compound in (B-4) accounts for almost all of clay minerals, and preferably ion exchange layered silicate.

Ion exchange layered silicate (hereinafter sometimes abbreviated to "silicate") is a silicate compound having a crystal structure in which the faces formed by ionic bond are laminated in parallel with bonding strength and the contained ion is exchangeable. Since almost all the silicates occur as the main components of clay minerals in nature, impurities (quartz, cristobalite and soon) other than ion exchange layered silicates are contained in many cases, and these impurities may be contained. Known silicate as the silicate may be used. Specifically, the following phyllosilicates as described, e.g., in Haruo Shirohzu, *Nendo Kobutsugaku* (*Clay Mineralogy*), Asakura Shoten (1995) are exemplified.

2:1 type minerals:

A smectite group, e.g., montmorillonite, sauconite, beidellite, nontronite, saponite, hectorite, and stevensite; a vermiculite group, e.g., vermiculite; a mica group, e.g., mica, illite, sericite, and glauconite;

a pyrophyllite-talc group, e.g., pyrophyllite and talc; and a chlorite group, e.g., Mg chlorite.

2:1 ribbon type minerals:

Sepiolite and palygorskite.

Silicates which are used in the invention as raw material may be phyllosilicates comprising the above mixed layers. In the present invention, main component silicate is preferably silicate having a 2:1 structure, more preferably smectite group, and particularly preferably montmorillonite. Silicates for use in the invention may be natural products or industrial materials, and these silicates can be used as they are with no particular processing, but preferably they are subjected to chemical treatment. Specifically, acid treatment, alkali treatment, salt treatment and treatment with organic substances are exemplified. These treatments may be used in combination. The conditions of these treatment are not particularly restricted in the present invention, and well-known conditions are applied.

Since these ion exchange layered silicates generally contain adsorbed water and water between layers, it is preferred to use them after removing water by heat dewatering treatment under inert gas flowing, and so on.

(C) Organoaluminum Compounds:

As organoaluminum compounds which are used in metallocene catalyst according to necessity, those not containing halogen are used in the present invention. Preferably a compound represented by the following formula is used. In addition, the compound exemplified as (B-1) aluminumoxy compound in (B) cocatalyst can also be used.

$AlR_{3-i}X_i$ (in the formula, R represents a hydrocarbon group having from 1 to 20 carbon atoms, X represents hydrogen, an alkoxyl group, a phenoxy group, a siloxy group or an amino group, i represents a number of $0 \leqq i < 3$, provided that when X represents hydrogen, i is $0 < i < 3$).

Specifically, trialkylaluminum, e.g., trimethyl-aluminum, triethylaluminum, tripropylaluminum, triisobutyl-aluminum, and trioctylaluminum, alkoxy group-containing alkylaluminum, e.g., dimethylaluminum methoxide, diethyl-aluminum methoxide, diisobutylaluminum methoxide, and diisobutylaluminumethoxide, phenoxy group-containing aluminum, e.g., dimethylaluminum phenoxide, siloxy group-containing aluminum, e.g., dimethylaluminum trimethyl siloxide, and dimethylaluminum triphenyl siloxide, amino group-containing aluminum, e.g., (diethylamino)diethylaluminum, and di(diethylamino)ethylaluminum, and halide-containing alkylaluminum, e.g., diethylaluminum halide are exemplified.

Of these organoaluminum compounds, trialkylaluminum is particularly preferred, and triisobutylaluminum and trioctylaluminum are more preferred.

(E) Use Amount of Catalyst Component and Others:

a. Use Amount:

Component (A) and component (B) are used in an optimal ratio of amounts in each combination.

When component (B) is an aluminumoxy compound, the molar ratio of Al/transition metal is generally from 10 to 100,000, preferably from 100 to 20,000, and particularly preferably from 100 to 10,000. On the other hand, when an ionic compound or a Lewis acid is used as component (B), the molar ratio to transition metal is generally from 0.1 to 1,000, preferably from 0.5 to 100, and more preferably from 1 to 50.

When a solid acid or ion exchange layered silicate is used as component (B), a transition metal complex is used in an amount of from 0.001 to 10 mmol per gram of component (B), and preferably from 0.001 to 1 mmol.

These use ratios are the ratios in general use, and when catalysts meet their object, the present invention is of course not limited to the above use ratios.

b. Pre-Polymerization Process:

Before a catalyst for polyolefin manufacture comprising a transition metal complex and a cocatalyst is used as the catalyst for olefin polymerization (main polymerization), if necessary, after being carried on a carrier, a small amount of olefin, e.g., ethylene, propylene, 1-butene, 1-hexene, 1-octene, 4-methyl-1-pentene, 3-methyl-1-butene, vinyl cycloalkane, or styrene, maybe preliminarily pre-polymerized. Preliminarily polymerization may be carried out by well-known methods.

(3) Regarding Olefins which are Used in Polymerization and Polymerization Reaction:

As olefins which can be polymerized by the catalyst for olefin polymerization of the invention, ethylene, propylene, butene-1,3-methyl-1-butene, 3-methyl-1-pentene, 4-methyl-1-pentene, vinyl cycloalkane, conjugated diene, e.g., butadiene, non-conjugated diene, e.g., 1,5-hexadiene, styrene and derivatives thereof are exemplified. Propylene is particularly preferred.

Also, as the polymerization, the present invention may preferably apply to not only a homo polymerization, but also a random copolymerization and a block copolymerization. As a comonomer in the copolymerization, ethylene may be also exemplified as well as the above-mentioned olefin.

Polymerization reaction is preferably performed by slurry polymerization and solution polymerization which are performed in the presence of an inert hydrocarbon solvent, e.g., butane, pentane, hexane, heptane, toluene or cyclohexane, bulk polymerization performed in the presence of a solvent, e.g., liquefied alpha-olefin, high pressure ionic polymerization performed under critical condition of alpha-olefin, or vapor phase polymerization under the conditions of substantially free of liquid phase, such as solvents and monomers. Vapor phase polymerization can be performed with a reaction apparatus, such as stirring-fluidized bed, equipped with a fluidized bed, a stirring bed and stirrer•mixer.

Conditions such as polymerization temperature and polymerization pressure are not particularly restricted, however, polymerization temperature is generally from −50 to 350° C., preferably from 0 to 300° C., and polymerization pressure is generally from atmospheric pressure to about 2,000 kgf/cm$^2$, preferably from atmospheric pressure to 1,500 kgf/cm$^2$, and more preferably from atmospheric pressure to 1,300 kgf/cm$^2$. Hydrogen may be present in the system of polymerization as the molecular weight adjustor.

BEST MODE FOR CARRYING OUT THE INVENTION

EXAMPLES

The present invention is specifically described in detail with reference to examples, but the present invention is not limited thereto.

Catalyst components were all handled under nitrogen atmosphere. Hexane used as the solvent in the examples of the invention means guaranteed reagent hexane obtained by passing through a column packed with molecular sieve (MS) to remove water content, and heptane means guaranteed reagent heptane obtained by passing through a column packed with MS to remove water content, unless otherwise indicated.

[Analysis of Halogen Atoms]

1. Collection and Analysis of Halogen Atom-Containing Compound in Gas:

Here, a halogen atom means fluorine, chlorine, bromine or iodine, unless otherwise indicated.

A halogen atom-containing compound in ethylene, propylene, hydrogen and nitrogen was collected as follows.

Water/ethanol solution of NaOH (0.1 mol/liter, the volume ratio of water to ethanol was 1/49) was put in two absorption tubes each in an amount of 70 ml, the absorption tubes were connected by series connection, and the absorption tubes were cooled.

A halogen atom-containing compound was absorbed by passing from 30 to 60 liters of the gas to be measured through the absorption tubes at a rate of about 0.5 to 1.0 liter/min. Then, 30 ml of the NaOH solution in each absorption tube was dispensed, neutralized in a nitric acid aqueous solution, and analyzed by ion chromatography.
Apparatus: DIONEX DX-500
Column: AG11+AS11
Temperature of thermostatic chamber: 35° C.
Flow rate of eluate: 2 ml/min
Eluate: NaOH aqueous solution (0.1 mmol/liter)
Detector: Electric conductivity As a result, a halogen atom-containing compound was not detected in all materials.

2. Collection and Analysis of Halogen Atom-Containing Compound in Solvent:

A halogen atom-containing compound in hexane, heptane and toluene was collected as follows.

Forty (40) ml of an NaOH aqueous solution (20 wt %) was dispensed in a separating funnel with 200 ml of hexane, heptane and toluene to be measured, the separating funnel was mounted on a shaker and shaken for 1 hour. Then, 15 ml of the NaOH aqueous solution was dispensed, neutralized in a nitric acid aqueous solution, and analyzed by ion chromatography on the above measurement condition.

As a result, a halogen atom-containing compound was not detected in guaranteed hexane, guaranteed heptane and guaranteed toluene.

3-1. Collection and Analysis of a Compound Containing Chlorine, Bromine or Iodine Atom in an Organoaluminum Dilution Solution:

Chemical properties of chlorine, bromine and iodine atoms are analogous. Accordingly, these atoms are detected at the same time by the following detecting method utilizing color reaction of iron thiocyanate, and the existing amounts are shown as integrated in the absorbance of wavelength of 460 nm.

Heptane dilution solution was dispensed in a separating funnel so that the organoaluminum compound to be analyzed became 0.5 g equivalent, and the total amount of the solution was adjusted to make 200 ml. Thereto was added 40 ml of an NaOH aqueous solution (20 wt %), the separating funnel was mounted on a shaker and shaken for 1 hour. Then, 15 ml of the NaOH aqueous solution was dispensed, and neutralized in a nitric acid aqueous solution. To the neutralized sample was added 10 ml of an ammonium ferric sulfate solution (60 g of ammonium ferric sulfate was dissolved in 6N nitric acid) In the next place, 5 ml of mercuric thiocyanate solution (3.0 g of mercuric thiocyanate was dissolved in 1 liter of ethanol (95 vol %)) was added thereto, and water was added to make the total amount of the solution 50 ml. The sample was subjected to shaking and coloring. Ten minutes after coloring, absorbance was measured with 460 nm (with a spectrophotometer U-3200, manufactured by Hitachi, Ltd.).

Determination of chlorine, bromine and iodine in the measured sample was performed by the comparison with the calibration curves prepared with separately performed blank measurement and the sample whose chlorine, bromine and iodine atom contents were known. As a result, chlorine, bromine and iodine atoms were not detected in the organoaluminum compound used this time.

3-2. Collection and Analysis of a Fluorine Atom-Containing Compound in an Organoaluminum Dilution Solution:

1. Collection of a Fluorine Atom-Containing Compound:

Heptane dilution solution was dispensed in a separating funnel so that the organoaluminum compound to be analyzed became 0.5 g equivalent, and the total amount of the solution was adjusted to make 200 ml. Thereto was added 40 ml of an NaOH aqueous solution (20 wt %), the separating funnel was mounted on a shaker and shaken for 1 hour. Then, 15 ml of the NaOH aqueous solution was dispensed, and neutralized in a nitric acid aqueous solution.

2. Preparation of Acid Suspension Solution of Zr-azo Dye:

p-Dimethylaminoazophenylarsonic acid (0.1 g) and 0.1 g of zirconium chloride oxide ($ZrOCl_2.8H_2O$) were separately added to hydrochloric acid (6 mol/liter) and dissolved. These solutions were heated to 40 to 60° C., and an azo dye solution was added slowly to the solutions and sufficiently stirred. After the solutions were allowed to stand for 30 minutes or more, insoluble red brown suspended substances were centrifuged, washed repeatedly with hydrochloric acid (1 mol/liter), suspended in 500 ml of hydrochloric acid (1 mol/liter), and preserved in a dark cold place.

3. Analysis of Fluorine Content:

Ten (10) ml of the solution obtained in 1. above was put into a 20 ml stoppered test tube, and 2.0 ml of hydrochloric acid (6 mol/liter) and 1.0 ml of the azo dye suspension solution were added thereto. After stopping the test tube, shaking for several seconds and allowing to stand for 15 minutes, the solution was immediately filtered through a paper filter. The filtrate was received in another dried stoppered test tube. About 1 ml of carbon tetrachloride was added to the test tube, the test tube was stopped, shaken for several seconds and immediately centrifuged for several minutes. The absorbance of a transparent pink aqueous solution phase was measured with wavelength of 500 nm. As a result, fluorine atom was not detected.

[Values of Physical Properties of Polymer]

Melt flow rate (MFR) Measured according to the test method of JIS-K7210-1995 at 230° C. and a load of 2.16 kgf in case of polypropylene, and at 190° C. and a load of 2.16 kgf in case of polyethylene.

Olefin Polymerization Example 1

Standard Example 1

Manufacture of Propylene Homopolymer:

The inside of a stirring type autoclave having an internal capacity of 2.4 liters equipped with a rupture disc on the inside was sufficiently substituted with nitrogen, and then 1.0 liter of guaranteed heptane (manufactured by Wako Pure Chemical Industries Ltd., obtained by passing guaranteed reagent through a column packed with MS to remove water content) was introduced into the autoclave. The rupture disc is used for the contact of a specific catalyst component under a polymerization atmosphere. To the heptane in the autoclave were added 3.5 ml of a heptane solution of tri-n-octylaluminum (0.1 mmol Al/ml heptane; the purified heptane the same as above was used), subsequently 6.8 ml of a toluene solution of triphenylmethyl-tetrakis-pentafluorophenyl borate (0.62 μmol/ml; the toluene was manufactured by Wako Pure Chemical Industries Ltd., obtained bypassing guaranteed reagent through a column packed with MS to remove water content). On the other hand, on the rupture disc side, 2.8 ml of a toluene solution of dimethylsilylenebis(4,5,6,7-tetrahydroindenyl)zirconium dimethyl (1.0 μmol/ml; the purified toluene the same as above was used) was added. Subsequently, the inner pressure of the autoclave was purged. The temperature of the autoclave was then raised to 85° C., the rupture disc was ruptured by the pressure of propylene, the partial pressure of propylene was controlled to be 0.5 MPa, and polymerization was performed at 85° C. for 1 hour. As a result, 29 g of a polymer was obtained. The activity of the polymer per gram of the metallocene complex was 25,000 g. The activity was 111% of the activity in Example 1. The content of the chlorine atom in the heptane and toluene measured was less than the limit of detection (<20 ppb). Other halogen atoms (F, Br and I) were also not detected.

Example 1

Manufacture of Propylene Homopolymer:

Polymerization was performed on the same conditions as in Olefin Polymerization Example 1, except for changing the heptane introduced into the 2.4 liter autoclave to recovered and purified heptane (hereinafter referred to as recovered heptane A) used in polypropylene manufacturing plant (Ziegler-Natta catalyst). As a result, 26 g of a polymer was obtained. The activity of the polymer per gram of the metallocene complex was 22,400 g.

As a result of the measurement of the halogen content in recovered heptane A, 0.05 wt ppm of Cl was contained. The total Cl atomic mol number in the solvent was 0.94 μmol calculated with the specific gravity of heptane as 0.67, and the ratio of the gram-atomic weight of Cl atom to the complex is 0.34. Other halogen atoms (F, Br and I) were not detected.

In addition, in Examples 2 to 10, Comparative Examples 1 to 7 and 9 to 10 described later, other halogen atoms (F, Br and I) were not detected, unless otherwise described.

Example 2

Manufacture of Propylene Homopolymer:

Polymerization was performed in the same manner as in Example 1, except for using 1.0 liter of recovered and purified heptane (hereinafter referred to as recovered heptane B) used in polyethylene manufacturing plant (Ziegler-Natta catalyst) in place of recovered heptane A. As a result, 22 g of a polymer was obtained. The activity of the polymer per gram of the metallocene complex was 19,000 g. The activity was 85% of the activity in Example 1. As a result of the measurement of the halogen content in recovered heptane B, 0.10 ppm of Cl was contained. The ratio of the gram-atomic weight of Cl atom to the metal of complex is 0.69.

Comparative Example 1

Manufacture of Propylene Homopolymer:

Polymerization was performed in the same manner as in Example 1, except for using 1.0 liter of recovered and purified heptane (hereinafter referred to as recovered heptane C) used in polypropylene manufacturing plant (Ziegler-Natta catalyst) in place of recovered heptane A. As a result, 16 g of a polymer was obtained. The activity of the polymer per gram of the metallocene complex was 13,800 g. The activity lowered to 62% of the activity in Example 1. As a result of the measurement of the halogen content in recovered heptane C, 0.14 ppm of Cl was contained. The ratio of the gram-atomic weight of Cl atom to the metal of complex is 0.96.

Comparative Example 2

Manufacture of Propylene Homopolymer:

The inside of a stirring type autoclave having an internal capacity of 2.4 liters equipped with a rupture disc on the inside was sufficiently substituted with nitrogen, and then 1.0 liter of guaranteed heptane was introduced into the autoclave. The rupture disc is used for the contact of a specific catalyst component under a polymerization atmosphere. To the heptane in the autoclave were added 3.5 ml of a heptane solution of tri-n-octylaluminum (0.1 mmol Al/ml heptane; the guaranteed heptane the same as above was used), 6.8 ml of a toluene solution of triphenylmethyl-tetrakis-pentafluorophenyl borate (0.62 μmol/ml; the toluene was manufactured by Wako Pure Chemical Industries Ltd., obtained bypassing guaranteed reagent through a column packed with MS to remove water content), and then 0.9 ml of a toluene solution of aluminum trichloride (1.0 μmol/ml; the purified toluene the same as above was used). On the other hand, on the rupture disc side, 2.8 ml of a toluene solution of dimethylsilylenebis (4,5,6,7-tetrahydroindenyl)zirconium dimethyl (1.0 μmol/ml; the purified toluene the same as above was used) was added. Subsequently, the inner pressure of the autoclave was purged. The temperature of the autoclave was then raised to 85° C., the rupture disc was ruptured by the pressure of propylene, the partial pressure of propylene was controlled to be 0.5 MPa, and polymerization was performed at 85° C. for 1 hour. As a result, 12 g of a polymer was obtained. The activity of the polymer per gram of the metallocene complex was 10,300 g. The activity was 46% of the activity in Example 1. MFR could not be measured for the excess flow. The ratio of the gram-atomic weight of Cl atom to the complex is 1.

Olefin Polymerization Example 2

Standard Example 2

Manufacture of Ethylene Homopolymer:
The inside of a stirring type autoclave having an internal capacity of 2.4 liters equipped with a rupture disc on the inside was sufficiently substituted with nitrogen, and then 1 liter of guaranteed heptane used in Olefin Polymerization Example 1 was introduced into the autoclave. To the heptane in the autoclave were added 3.5 ml of a heptane solution of tri-n-octylaluminum (0.1 mmol Al/ml heptane; the purified heptane the same as above was used), subsequently 6.8 ml of a toluene solution of triphenylmethyl-tetrakis-pentafluorophenyl borate (0.62 μmol/ml; the toluene was manufactured by Wako Pure Chemical Industries Ltd., obtained by passing guaranteed reagent through a column packed with MS to remove water content). On the other hand, on the rupture disc side, 2.8 ml of a toluene solution of dimethylsilylenebis(4,5,6,7-tetrahydroindenyl)zirconium dimethyl (1.0 μmol/ml; the purified toluene the same as above was used) was added. Subsequently, the inner pressure of the autoclave was purged and 65 cc of hydrogen was introduced. The temperature of the autoclave was then raised to 85° C., the rupture disc was ruptured by the pressure of ethylene, the partial pressure of ethylene was controlled to be 0.1 MPa, and polymerization was performed at 85° C. for 1 hour. As a result, 81 g of a polymer was obtained. The activity of the polymer per gram of the metallocene complex was 69, 800 g. The activity was 105% of the activity in Example 3. MFR was 0.2 g/10 min.

Example 3

Manufacture of Ethylene Homopolymer:
Polymerization was performed on the same conditions as in Olefin Polymerization Example 2, except for introducing 1.0 liter of recovered heptane A used in Example 1 into the 2.4 liter autoclave in place of guaranteed heptane. As a result, 77 g of a polymer was obtained. The activity of the polymer per gram of the metallocene complex was 66,400 g. MFR was 0.2 g/min. As the halogen content in recovered heptane A, 0.05 ppm of Cl was contained. The ratio of the gram-atomic weight of Cl atom to the metal of complex is 0.34.

Example 4

Manufacture of Ethylene Homopolymer:
Polymerization was performed in the same manner as in Example 3, except for using 1.0 liter of recovered heptane B in place of recovered heptane A. As a result, 69 g of a polymer was obtained. The activity of the polymer per gram of the metallocene complex was 59,500 g. The activity was 90% of the activity in Example 3. MFR was 0.5 g/10 min. As the halogen content in recovered heptane B, 0.10 ppm of Cl was contained. The ratio of the gram-atomic weight of Cl atom to the metal of complex is 0.69.

Comparative Example 3

Manufacture of Ethylene Homopolymer:
Polymerization was performed in the same manner as in Example 3, except for using 1.0 liter of recovered heptane C used in Comparative Example 1 in place of recovered heptane A. As a result, 55 g of a polymer was obtained. The activity of the polymer per gram of the metallocene complex was 47,400 g. The activity lowered to 71% of the activity in Example 3. MFR was 2.0 g/10 min. As the halogen content in recovered heptane C, 0.14 ppm of Cl was contained. The ratio of the gram-atomic weight of Cl atom to the metal of complex is 0.96.

Comparative Example 4

Manufacture of Ethylene Homopolymer:
The inside of a stirring type autoclave having an internal capacity of 2.4 liters equipped with a rupture disc on the inside was sufficiently substituted with nitrogen, and then 1.0 liter of guaranteed heptane was introduced into the autoclave. The rupture disc is used for the contact of a specific catalyst component under a polymerization atmosphere. To the heptane in the autoclave were added 3.5 ml of a heptane solution of tri-n-octylaluminum (0.1 mmol Al/ml heptane; the guaranteed heptane the same as above was used), 6.8 ml of a toluene solution of triphenylmethyl-tetrakis-pentafluorophenyl borate (0.62 μmol/ml; the toluene was manufactured by Wako Pure Chemical Industries Ltd., obtained by passing guaranteed reagent through a column packed with MS to remove water content), and then 0.9 ml of a toluene solution of aluminum trichloride (1.0 μmol/ml; the purified toluene the same as above was used). On the other hand, on the rupture disc side, 2.8 ml of a toluene solution of dimethylsilylenebis (4,5,6,7-tetrahydroindenyl)zirconium dimethyl (1.0 μmol/ml; the purified toluene the same as above was used) was added. Subsequently, the inner pressure of the autoclave was purged and 65 cc of hydrogen was introduced. The temperature of the autoclave was then raised to 85° C., the rupture disc was ruptured by the pressure of ethylene, the partial pressure of ethylene was controlled to be 0.1 MPa, and polymerization was performed at 85° C. for 1 hour. As a result, 45 g of a polymer was obtained. The activity of the polymer per gram of the metallocene complex was 38,800 g. The activity was 58% of the activity in Example 3. MFR was 3.5 g/10 min. The ratio of the gram-atomic weight of Cl atom to the complex is 1.

Comparative Example 5

Manufacture of Ethylene Homopolymer:
Polymerization was performed in the same manner as in Comparative Example 4, except for using 2.8 ml of a toluene solution of n-butyl chloride (1.0 μmol/ml) in place of a toluene solution of aluminum trichloride. As a result, 53 g of a polymer was obtained. The activity of the polymer per gram of the metallocene complex was 45,700 g. The activity was 69% of the activity in Example 3. MFR was 2.5 g/10 min. The ratio of the gram-atomic weight of Cl atom to the complex is 1.

Olefin Polymerization Example 3

Manufacture of Catalyst and Pre-Polymerization:
The following operation was performed under an inert gas by using a deoxidized and dehydrated solvent and a monomer. The halogen content in the working solvent was measured but halogen was not detected.

In a flask having a capacity of 200 ml, 60 ml of toluene was added to (r)-dichloro[1,1'-dimethylsilylenebis{2-ethyl-4-(2-fluoro-4-biphenyl)-4H-azulenyl}]hafnium (304 μmol) to make slurry, 0.85 ml (600 μmol) of a heptane solution of triisobutylaluminum was added thereto and the slurry was stirred at room temperature for 60 minutes. This reaction product was introduced into a 1 liter flask holding 9.99 g of MAO-carrying silica (85 mmol-Al) (manufactured by WITCO CORPORATION) and 100 ml of heptane, and the slurry was stirred at room temperature for 60 minutes.

Subsequently, 340 ml of heptane was further added to the slurry and the mixed slurry was introduced to a stirring type autoclave having an internal capacity of 1 liter, and propylene was supplied thereto at a constant velocity of 238.1 mmol/hr (10 g/hr) for 120 minutes.

After the completion of propylene supply, the temperature was raised to 50° C. and the temperature was maintained for 2 hours, and then the remaining gas was purged and the pre-polymerized catalyst slurry was recovered from the autoclave. The recovered pre-polymerized catalyst slurry was allowed to stand and the supernatant was taken out. To the remained solid was added 8.5 ml (6.0 mmol) of a heptane solution of triisobutylaluminum at room temperature, and the mixed product was stirred at room temperature for 10 minutes, dried under reduced pressure, thereby 66.6 g of a solid catalyst was recovered.

The yield of pre-polymerization (a value obtained by dividing the amount of the prep-polymerized polymer by the amount of the solid catalyst) was 2.22.

Manufacture of Propylene Homopolymer:

The inside of a stirring type autoclave having an internal capacity of 3.9 liters was sufficiently substituted with nitrogen, and 20 ml of triisobutylaluminum (TiBA) diluted with hexane (manufactured by Wako Pure Chemical Industries Ltd., obtained by passing guaranteed reagent through a column packed with MS to remove water content) was introduced to the autoclave. After that, 300 ml of hydrogen and then 750 g of liquid propylene were added thereto, the temperature was raised to 70° C. and the temperature was maintained. The concentration of TiBA diluted with hexane was 0.1 mmol-Al/ml.

The above-obtained pre-polymerized catalyst was slurried with hexane (manufactured by Wako Pure Chemical Industries Ltd., obtained by passing guaranteed reagent through a column packed with MS to remove water content), and 40 mg of the slurry was injected to the above autoclave and polymerization was started. The temperature of the tank was maintained at 70° C. After one hour, 5 ml of ethanol was added, the remaining gas was purged, and the obtained polymer was dried. As a result, 218 g of a polymer was obtained. The catalytic activity was 5,450 g-PP/g-catalyst-hr, and the activity was 120% of the activity in Example 5. MFR was 160 g/10 min.

Example 5

Manufacture of Propylene Homopolymer:

Polymerization was performed on the same conditions as in Olefin Polymerization Example 3, except for using "recovered hexane D" in place of hexane for TiBA dilution. Accordingly, the concentration of TiBA diluted with hexane was 0.1 mmol-Al/ml. "Recovered hexane D" is a recovered solvent which was used in Ziegler-Natta catalyst manufacturing plant, and is used again in the plant through distillation column and MS packed column.

As a result, 182 g of a polymer was obtained. The catalytic activity was 4,550 g-PP/g-catalyst-hr. MFR was 223 g/10 min. As the halogen content in recovered hexane D, 0.70 ppm of Cl was contained. The total Cl mol number in polymerization was 0.26 μmol calculated by approximation with the specific gravity of TiBA hexane solution as 0.66, and the molar ratio of Cl atom to the hafnium atom of the complex is 0.21 gram-atomic weight.

Example 6

Manufacture of Propylene Homopolymer:

Polymerization was performed in the same manner as in Example 5, except that 20 ml of recovered hexane D was further added.

As a result, 150 g of a polymer was obtained. The catalytic activity was 3,750 g-PP/g-catalyst-hr, and the activity was 82% of the activity in Example 5. MFR was 307 g/10 min. The total Cl mol number in polymerization was 0.52 μmol, and the ratio of Cl atom to the hafnium atom of the complex is 0.42 gram-atomic weight.

Comparative Example 6

Manufacture of Propylene Homopolymer:

Polymerization was performed in the same manner as in Olefin Polymerization Example 3, except that 0.0012 mmol of n-butyl chloride was added.

As a result, 76 g of a polymer was obtained. The catalytic activity was 1,905 g-PP/g-catalyst-hr, and the activity was 42% of the activity in Example 5. MFR was 803 g/10 min. The ratio of Cl atom to the hafnium atom of the complex is 0.99 gram-atomic weight.

Olefin Polymerization Example 4

Manufacture of Catalyst and Pre-Polymerization:

1. Preparation of Catalyst:

Distilled water 1,130 g) and 750 g of 96% sulfuric acid were introduced to a separable flask, and 300 g of granulated montmorillonite having an average particle size of 25 μm (BENCLAY SL, manufactured by MIZUSAWA INDUSTRIAL CHEMICALS, LTD.) was added thereto, and the system was allowed to react for 5 hours. The temperature was lowered to room temperature over 1 hour, and the reaction product was washed with distilled water until pH became 3.69. The rate of washing at this time was 1/10,000 or less. Apart of the solid at this stage was dried and subjected to acid treatment, the elution rate was 33.5%.

Lithium sulfate monohydrate (211 g) was dissolved with 521 g of distilled water, 100 g (dry weight) of the above-obtained acid-treated solid was added to the solution, and the mixture was stirred at room temperature for 120 minutes. This slurry was filtered, and 3,000 g of distilled water was added to the thus-obtained solid, followed by stirring for 5 minutes at room temperature. This slurry was further filtered, 2,500 g of distilled water was added to the thus-obtained solid, followed by stirring for 5 minutes, and the slurry was filtered again. This procedure was repeated further four times. The obtained solid was preliminarily dried under nitrogen current at 130° C. for two days, coarse particles having a particle size of 53 μm or more were removed, and the reaction product was further dried at 200° C. for two hours under reduced pressure, thus chemically treated montmorillonite was obtained.

The chemically treated montmorillonite was heat-treated under reduced pressure at 200° C. for two hours. The above-obtained dried montmorillonite (200 g) was introduced into a glass reactor having an internal capacity of 3 liters and equipped with stirring blades, normal heptane, further a heptane solution of triethylaluminum (10 mmol) were added thereto, and stirred at room temperature. After 1 hour, the slurry was washed with normal heptane (residual liquid rate was less than 1%), thus 2,000 ml of slurry was prepared.

In the next place, a mixed solution was prepared by reacting 870 ml of toluene slurry of 3 mmol of (r)-dimethylsilylenebis [2-methyl-4-(4-chlorophenyl)-4H-azulenyl]zirconium dichloride and 42.6 ml of a heptane solution of 30 mmol of triisobutylaluminum at room temperature for 1 hour. This mixed solution was added to the montmorillonite slurry and stirred for 1 hour.

2. Pre-Polymerization:

Subsequently, 2.1 liters of normal heptane was introduced to a stirring type autoclave having an internal capacity of 10 liters sufficiently substituted with nitrogen, and the temperature was maintained at 40° C. Thereto was introduced the above-prepared montmorillonite/complex slurry. When the temperature was stabilized at 40° C., propylene was supplied at the velocity of 100 g/hr, and the temperature was maintained at 40° C. After 4 hours, the supply of propylene was ceased, and the system was allowed to stand for 2 hours. About 3 liter of the supernatant was removed from the recovered pre-polymerized catalyst slurry, 170 ml of heptane solution of triisobutylaluminum (30 mmol) was added thereto. After stirring the slurry for 10 minutes, the slurry was heat-treated at 40° C. under reduced pressure. By this operation, pre-polymerized catalyst containing 2.06 g of polypropylene per gram of the catalyst was obtained.

3. Manufacture of Propylene-Ethylene Random Copolymer:

The inside of a stirring type autoclave having an internal capacity of 2.4 liters was sufficiently substituted with nitrogen, and 4 ml of triisobutylaluminum (TiBA) diluted with hexane (manufactured by Wako Pure Chemical Industries Ltd., obtained by passing guaranteed reagent through a column packed with MS to remove water content) was introduced to the autoclave. After that, 16 g of ethylene, 30 ml of hydrogen and then 750 g of liquid propylene were added thereto, the temperature was raised to 70° C. and the temperature was maintained. The concentration of TiBA diluted with hexane was 0.5 mmol-Al/ml. The above-obtained pre-polymerized catalyst was slurried with hexane (manufactured by Wako Pure Chemical Industries Ltd., obtained by passing guaranteed reagent through a column packed with MS to remove water content), and 15 mg of the catalyst (not including the weight of pre-polymerized polymer) was injected to the above autoclave and polymerization was started. The inner temperature of the tank was maintained at 70° C. After one hour, 5 ml of ethanol was added, the remaining gas was purged, and the obtained polymer was dried. As a result, 272 g of a polymer was obtained.

The catalytic activity was 18,100 g-PP/g-catalyst-hr, and the activity was 112% of the activity in Example 7. MFR was 7.2 g/10 min. The ethylene content was 1.9 wt %. The halogen content in the guaranteed hexane was measured but not detected.

Example 7

Manufacture of Propylene-Ethylene Random Copolymer:

Polymerization was performed on the same conditions as in Olefin Polymerization Example 4, except for using recovered hexane D in place of hexane for TiBA dilution. Accordingly, the concentration of TiBA diluted with hexane was 0.5 mmol-Al/ml.

As a result, 241 g of a polymer was obtained. The catalytic activity was 16,100 g-PP/g-catalyst-hr. MFR was 15 g/10 min, and the ethylene content was 1.9 wt %.

As described above, the Cl content in recovered hexane D is 0.70 wt ppm. Further, according to the description in "1. Preparation of catalyst" in Olefin Polymerization Example 4, the metal content in the catalyst is 200 g of montmorillonite to 3 mmol of the complex, i.e., 15 μmol/g-montmorillonite, and since the catalyst introduced to the reactor was 15 mg, it can be calculated as $2.25 \times 10^{-7}$ (mol). Further, the mol number of the chlorine atom can be computed as, with the specific gravity of TiBA hexane solution as 0.66 in approximation:

Amount of chlorine atom (mol)=4 (ml)×0.66 (g/ml)× 0.70 (wt ppm)/35.5=$5.21 \times 10^{-8}$ (mol)

Accordingly, chlorine atom in the reactor/metal atom (mol/mol) =$5.21 \times 10^{-8}/2.25 \times 10^{-7}$=0.23. Accordingly, the molar ratio of Cl atom to the hafnium atom of the complex is 0.23 gram-atomic weight.

Example 8

Polymerization was performed on the same conditions as in Example 7, except for changing the concentration of recovered hexane D for TiBA dilution to 0.25 mmol-Al/ml.

As a result, 219 g of a polymer was obtained. The catalytic activity was 14,600 g-PP/g-catalyst-hr, and the activity was 91% of the activity in Example 7. MFR was 38 g/10 min, and the ethylene content was 1.9 wt %. The molar ratio of Cl atom to the complex is 0.46.

Example 9

Polymerization was performed on the same conditions as in Example 7, except for changing the addition amount of the catalyst to 10 mg. As a result, 122 g of a polymer was obtained. The catalytic activity was 12,200 g-PP/g-catalyst·hr, and the activity was 76% of the activity in Example 7. MFR was 53 g/10 min, and the ethylene content was 1.9 wt %. The molar ratio of Cl atom to the complex is 0.69.

Comparative Example 7

Polymerization was performed on the same conditions as in Example 7, except for changing the concentration of recovered hexane D of TiBA to 0.1 mmol.

As a result, 97 g of a polymer was obtained. The catalytic activity was 6,500 g-PP/g-catalyst·hr, and the activity was 40% of the activity in Example 7. MFR was 107 g/10 min, and the ethylene content was 1.9 wt %. The molar ratio of Cl atom to the complex is 1.16.

Comparative Example 8

Polymerization was performed on the same conditions as in Olefin Polymerization Example 4, except for adding 0.5 mg of Chesterton 900 Gold End (a sealing paste for gasket of a flange, manufactured by Chesterton Company). From 10 to 15 wt % of polychlorotrifluoroethane is contained in Chesterton 900 Gold End.

As a result, 39 g of a polymer was obtained. The catalytic activity was 2,600 g-PP/g-catalyst·hr, and the activity was 16% of the activity in Example 7. MFR was 315 g/10 min, and the ethylene content was 1.9 wt %. The molar ratio of Cl atom to the complex is from 1.9 to 2.9, and the molar ratio of F atom to the complex is from 5.7 to 8.7. Other halogen atoms (Br and I) were not detected.

Comparative Example 9

Polymerization was performed on the same conditions as in Olefin Polymerization Example 4, except for adding 0.1 mmol of diethylaluminum chloride.

As a result, 22 g of a polymer was obtained. The catalytic activity was 1,500 g-PP/g-catalyst·hr, and the activity was 9% of the activity in Example 7. MFR could not be measured for the excess flow, and the ethylene content was 1.9 wt %. The molar ratio of Cl atom to the complex is 444.

Olefin Polymerization Example 5

Manufacture of Catalyst and Pre-Polymerization:

An aqueous solution of lithium hydroxide was prepared by introducing 500 g of distilled water and 249 g (5.93 mol) of lithium hydroxide monohydrate to a separable flask equipped with stirring blades and reflux unit and having a capacity of 5 liters. Separately, 581 g (5.93 mol) of sulfuric acid was diluted with 500 g of distilled water, and the solution was dripped to the above lithium hydroxide aqueous solution by means of a dropping funnel. Commercially available granulated montmorillonite (350 g) (BENCLAY SL having an average particle size of 28.0 µm, manufactured by MIZUSAWA INDUSTRIAL CHEMICALS, LTD.) was further added thereto. After that, the temperature was raised to 108° C. over 30 minutes and the temperature was maintained for 150 minutes. Subsequently, the temperature was lowered to 50° C. over 1 hour. A cake was recovered from this slurry by filtration under reduced pressure. Pure water (5.0 liters) was added to the cake and the cake was slurried again, and then a cake was recovered by filtration. This procedure was repeated further four times.

The recovered cake was dried at 110° C. overnight under nitrogen atmosphere. As a result, 275 g of chemically treated montmorillonite was obtained. The above-manufactured chemically treated montmorillonite was dried under reduced pressure at 200° C. for 4 hours.

The above-obtained chemically treated montmorillonite (200 g) was introduced to an autoclave having an internal capacity of 10 liters, and 1,160 ml of heptane, and 840 ml (0.5 mol) of a heptane solution of triethylaluminum (0.6 mmol/ml) was added thereto over 30 minutes, and the system was stirred at 25° C. for 1 hour. After that, the slurry was allowed to stand for precipitation. The supernatant (1,300 ml) was taken out, and the remained product was washed with 2,600 ml of heptane two times, and heptane was additionally added to make the final total amount of heptane 1,200 ml.

Subsequently, 2.97 g (3.9 mmol) of dimethylsilylene-bis[2-ethyl-4-(2-fluoro-4-biphenyl)-4H-azulenyl]hafnium dichloride and 516 ml of heptane were introduced to a 2 liter flask, thoroughly stirred, and then 42 ml (5.9 g) of a heptane solution of triisobutylaluminum (140 mg/ml) was added thereto at room temperature, followed by stirring for 60 minutes. Subsequently, the above solution was introduced to the montmorillonite slurry prepared in the autoclave, and the reaction system was stirred for 60 minutes. Further, heptane was added to make the total volume 5 liters, and the temperature was maintained at 30° C.

Propylene was introduced to the slurry at a constant velocity of 100 g/hr at 40° C. for 4 hours, subsequently at 50° C. for 2 hours. The pre-polymerized catalyst slurry was recovered by a syphon and, after removing the supernatant, the remained product was dried at 40° C. under reduced pressure. By this procedure, a pre-polymerized catalyst containing 2.0 g of polypropylene per gram of the catalyst was obtained.

Manufacture of Propylene Homopolymer:

Propylene was polymerized by using the above-obtained pre-polymerized catalyst by vapor phase polymerization. That is, heptane (manufactured by Wako Pure Chemical Industries Ltd., obtained by passing guaranteed reagent through a column packed with MS to remove water content), the slurry catalyst and TiBA diluted with heptane (concentration: 0.01 g/ml) were intermittently supplied to a continuous system vapor phase polymerization reactor in which mixed gas of propylene and hydrogen (hydrogen/propylene: 0.026%) was circulating. The supply amount of the catalyst component (the amount excluding the pre-polymerized polymer) was 75 mg/hr and TiBA was 1 g/hr. The polymerization reaction was performed on the conditions of temperature of 80° C., the partial pressure of propylene of 2.1 MPa, average residence time of 6.4 hours.

The average polymerization rate of the manufactured polypropylene was 240 g/hr, the catalytic activity was 3,200 g-PP/g-catalyst-hr, and MFR was 59 g/10 min. The halogen content in the guaranteed heptane was measured but not detected.

Example 10

Polymerization was performed on the same conditions as in Olefin Polymerization Example 5, except for using recovered heptane C for the dilution of TiBA.

The average polymerization rate of the manufactured polypropylene was 210 g/hr, the catalytic activity was 2,800 g-PP/g-catalyst·hr, and MFR was 83 g/10 min. The Cl content in the recovered heptane B measured was 0.14 ppm. The molar ratio of Cl atom to the complex is 0.24.

Comparative Example 10

Polymerization was performed on the same conditions as in Example 10, except for changing the dilution solvent of TiBA added to the polymerization tank to recovered hexane D used in Example 7.

The average polymerization rate of the manufactured polypropylene was 100 g/hr, the catalytic activity was 1,300 g-PP/g-catalyst·hr, and MFR was 233 g/10 min. The molar ratio of Cl atom to the complex is 1.12.

The data of the results of Polymerization Examples, Examples and Comparative Examples are shown in Tables 1 and 2 below.

TABLE 1

| | Molar Ratio of Halogen | Catalytic Activity (g-polymer/g-transition metal compound · hr) | Activity Based on Base Example (%) | MFR (g/10 min) |
|---|---|---|---|---|
| Polymerization Example 1 | — | 25,000 | 111 | |
| Example 1 | 0.34 | 22,400 | 100 | |
| Example 2 | 0.69 | 19,000 | 85 | |
| Comparative Example 1 | 0.96 | 13,800 | 62 | |
| Comparative Example 2 | 1.00 | 10,300 | 46 | Measurement impossible due to excess flow |
| Polymerization Example 2 | — | 69,800 | 105 | 0.2 |
| Example 3 | 0.34 | 66,400 | 100 | 0.2 |
| Example 4 | 0.69 | 59,500 | 90 | 0.5 |
| Comparative Example 3 | 0.96 | 47,400 | 71 | 2.0 |
| Comparative Example 4 | 1.00 | 38,800 | 58 | 3.5 |
| Comparative Example 5 | 1.00 | 45,700 | 69 | 2.5 |

Industries Ltd., obtained by passing guaranteed reagent through a column packed with MS to remove water content are used, the material gases were also on the level lower than the limit of detection of halogen compounds, and polymerization apparatus are also clean and apparatus on the laboratory level). Polymerization performed in each Example is polymerization in which recovered solvents are reused in commercial level plants, accordingly, halogen compounds originating in solvents, material monomers and polymerization apparatus are present, and the value 0.8 which is the main constituent of the present invention is prescribed from the experiment data of the molar ratio of these halogens. Each Comparative Example, in which the ratio of halogen atom in the present invention exceeds 0.8, is compared with each Example. As described above, in each Example and Comparative Example, of halogens, Br, I and At are all lower than the limit of detection.

The molar ratio of halogen represents the gram-atomic amount ratio of halogen as impurities to a transition metal of a metallocene catalyst, which is the main component of the present invention. "Activity (%)" in each table represents, e.g., the ratio (%) of each example described in Table 1 to the catalytic activity in Example 1. MFR is a physical index widely used in polyolefin, it is a standard of molecular weight

TABLE 2

| | Molar Ratio of Halogen | Catalytic Activity (g-polymer/g-catalyst · hr) | Activity Based on Base Example (%) | MFR (g/10 min) |
|---|---|---|---|---|
| Polymerization Example 3 | — | 5,450 | 120 | 160 |
| Example 5 | 0.21 | 4,550 | 100 | 223 |
| Example 6 | 0.42 | 3,750 | 82 | 307 |
| Comparative Example 6 | 0.99 | 1,905 | 42 | 803 |
| Polymerization Example 4 | — | 18,100 | 112 | 7.2 |
| Example 7 | 0.23 | 16,100 | 100 | 15 |
| Example 8 | 0.46 | 14,600 | 91 | 38 |
| Example 9 | 0.69 | 12,200 | 76 | 53 |
| Comparative Example 7 | 1.16 | 6,500 | 40 | 107 |
| Comparative Example 8 | Cl: 1.9 to 2.9 F: 5.7 to 8.7 | 2,600 | 16 | 315 |
| Comparative Example 9 | 444 | 1,500 | 9 | Measurement impossible due to excess flow |
| Polymerization Example 5 | — | 3,200 | 114 | 59 |
| Example 10 | 0.24 | 2,800 | 100 | 83 |
| Comparative Example 10 | 1.12 | 1,300 | 46 | 233 |

As described above, Examples 1 and 2 and Comparative Examples 1 and 2 are on the basis of Olefin Polymerization Example 1, Examples 3 and 4 and Comparative Examples 3 to 5 are on the basis of Olefin Polymerization Example 2, Examples 5 and 6 and Comparative Example 6 are on the basis of Olefin Polymerization Example 3, Examples 7 to 9 and Comparative Examples 7 to 9 are on the basis of Olefin Polymerization Example 4, and Example 10 and Comparative Example 10 are on the basis of Olefin Polymerization Example 5. Accordingly, each of these should be compared as one block.

In Olefin Polymerization Examples 1 to 5 are the examples of standard polymerization of a laboratory level (in particular, as the solvents those manufactured by Wako Pure Chemical and moldability, and the lower the value, the greater is the molecular weight, and the lower is the melt flowability in molding.

[Consideration of the results of Examples and Comparative Examples]

By contrasting each of the above Examples and Comparative Examples, it is apparent that the present invention can realize polymerization excellent in catalytic activity and high in polymerization efficiency, and, from MFR value, polymers having high molecular weight and suitable to moldability can be manufactured.

Specifically, in the propylene polymerization, polymerization reaction of the Example 1 close to Polymerization Example 1, which is a clean laboratory level is performed by setting the molar ratio of halogen considerably lower than 0.8, which is defined in the present invention, and has the almost same result as Polymerization Example 1 in view of catalytic activity. Examples 2 and 3, although the molar ratio of halogen is a little higher than that in Example 1, the value is 0.8 or less of the prescription of the invention, so that the value of catalytic activity near to that of Example 1 is obtained. The results of Examples 1 and 2 indicate that the molar ratio of halogen of 0.6 or less is more preferred. This tendency is also the same in the polymerization of ethylene, this is apparent from the Comparison of Examples 3 and 4 and Comparative Examples 3 to 5 with Polymerization Example 2 as the standard. The molecular weight of polymers in Examples is also superior to in Comparative Examples. Regarding the superiority of the molecular weight, the same effect is also confirmed in propylene polymerization, which is apparent from the comparison of Examples 7 to 9 and Comparative Examples 7 to 9. In Comparative Example 9, the molar ratio of halogen is very high, so that catalytic activity is very inferior to each Example, MFR value is incapable of measurement, and practicable polymer cannot be manufactured.

From the results of polymerization by different kinds of catalysts in Examples and Comparative Examples, it is confirmed that the present invention can be applied to metallocene catalysts in wide use.

INDUSTRIAL APPLICABILITY

According to the present invention, the activity of single site catalysts and polymerization efficiency can be conspicuously increased by adopting epoch-making means of controlling halogen compounds in manufacturing plants of commercial level of olefin polymerization by single site catalysts, and high molecular weight olefin polymers excellent in moldability can be manufactured.

By these advantages, the performances of metallocene catalysts can be sufficiently brought out and stable production can be maintained, thereby large-scale and efficient industrialization of olefin polymerization by metallocene catalysts can be embodied.

The invention claimed is:

1. A method for producing a polyolefin comprising:
polymerizing an olefin with a single site catalyst in a reactor, while controlling the amount of a halogen-containing compound that is not a catalyst component in said reactor such that the molar ratio of a halogen atom in the halogen-containing compound to a transition metal in the single site catalyst is 0.8 or less, wherein the halogen-containing compound is derived from at least one material added to said reactor and/or at least one material produced in said reactor, and said controlling comprises assaying the amount of halogen atoms present in the reactor by at least one of the following three methods:
a. measuring the amount of the halogen atoms contained in the materials in advance, and assaying the amount of the halogen atoms present in the reactor from the amount of each material introduced into the reactor,
b. assaying the amount of the halogen atoms present in the reactor after each material has been introduced into the reactor, or after manufacturing conditions have become a steady-state in the case of continuous process, by directly sampling the halogen atoms from the reactor, and
c. determining the amount of halogen atoms by sampling halogen atoms in the middle of the line circulating each material, and assaying the amount of the halogen atoms introduced into the reactor from the balance of the amount of each material circulating in the reactor and that discharged from the reactor.

2. The method for producing a polyolefin as claimed in claim 1, wherein the single site catalyst is a metallocene catalyst comprising the following components (A) and (B), wherein
component (A) is a metallocene complex, and
component (B) is a cocatalyst.

3. The method for producing a polyolefin as claimed in claim 1, wherein the polyolefin is a polymer of one or more olefins and wherein the olefin is at least one olefin selected from the group consisting of ethylene and an alpha-olefin having 3 or more carbon atoms.

4. The method for producing a polyolefin as claimed in claim 2, wherein the transition metal of the metallocene complex in the metallocene catalyst has a conjugated 5-membered ring ligand and belongs to Groups 4 to 6 of the Periodic Table.

5. The method for producing a polyolefin as claimed in claim 2, wherein the cocatalyst which activates the metallocene complex in the metallocene catalyst is at least one member selected from the group consisting of an aluminumoxy compound, an ionic compound, a Lewis acid, a solid acid and an ion exchange layered silicate.

6. The method for producing a polyolefin as claimed in claim 2, wherein the cocatalyst which activates the metallocene complex is an organic boron compound, and a polyolefin to be produced is a polymer of ethylene or propylene, a copolymer of ethylene and alpha-olefin having 3 or more carbon atoms, or a copolymer of propylene and other alpha-olefin having 2 or more carbon atoms.

7. The method for producing a polyolefin as claimed in claim 1, which comprises controlling at least one member selected from the group consisting of the amount of an organic compound to which a halogen atom is bonded, the amount of a silicon atom-containing compound to which a halogen atom is bonded, the amount of an aluminum atom-containing compound to which a halogen atom is bonded, the amount of a compound to which a halogen atom in an organic solvent is bonded and the amount of a halogen-containing compound which is the impurity from a polymerization apparatus.

8. The method for producing a polyolefin as claimed in claim 1, wherein the halogen is chlorine.

9. The method for producing a polyolefin as claimed in claim 1, wherein the halogen-containing compound is controlled by performing analysis of materials and auxiliaries and utilizing them when the halogen-containing compound content of the materials and auxiliaries are lower than a tolerance set in advance.

10. The method for producing a polyolefin as claimed in claim 1, wherein the halogen-containing compound is controlled by refining materials and auxiliaries with distillation or chemical reaction techniques and with physical adsorption methods.

11. The method for producing a polyolefin as claimed in claim 1, wherein the halogen-containing compound is controlled by removing the halogen-containing compounds from the polymerization reaction systems with chemical reaction techniques and physical adsorption methods.

12. The method for producing a polyolefin as claimed in claim 1, wherein the single site catalyst is a metallocene catalyst comprising the following components (A), (B) and (C): wherein component (A) is a metallocene complex,
component (B) is a cocatalyst, and
component (C) is an organoaluminum compound which is not an organoaluminum halide compound.

13. The method for producing a polyolefin as claimed in claim 1, wherein the halogen-containing compound is from the sealing paste of gasket of a flange.

14. The method for producing a polyolefin as claimed in claim 1, wherein the halogen-containing compound is controlled by minimizing the use of sealing pastes in the polymerization apparatus and by maintaining a clean polymerization apparatus system.

* * * * *